July 3, 1928.  1,676,106
J. MICHALKA, JR., ET AL
STALK CUTTER
Filed April 1, 1926  3 Sheets-Sheet 1
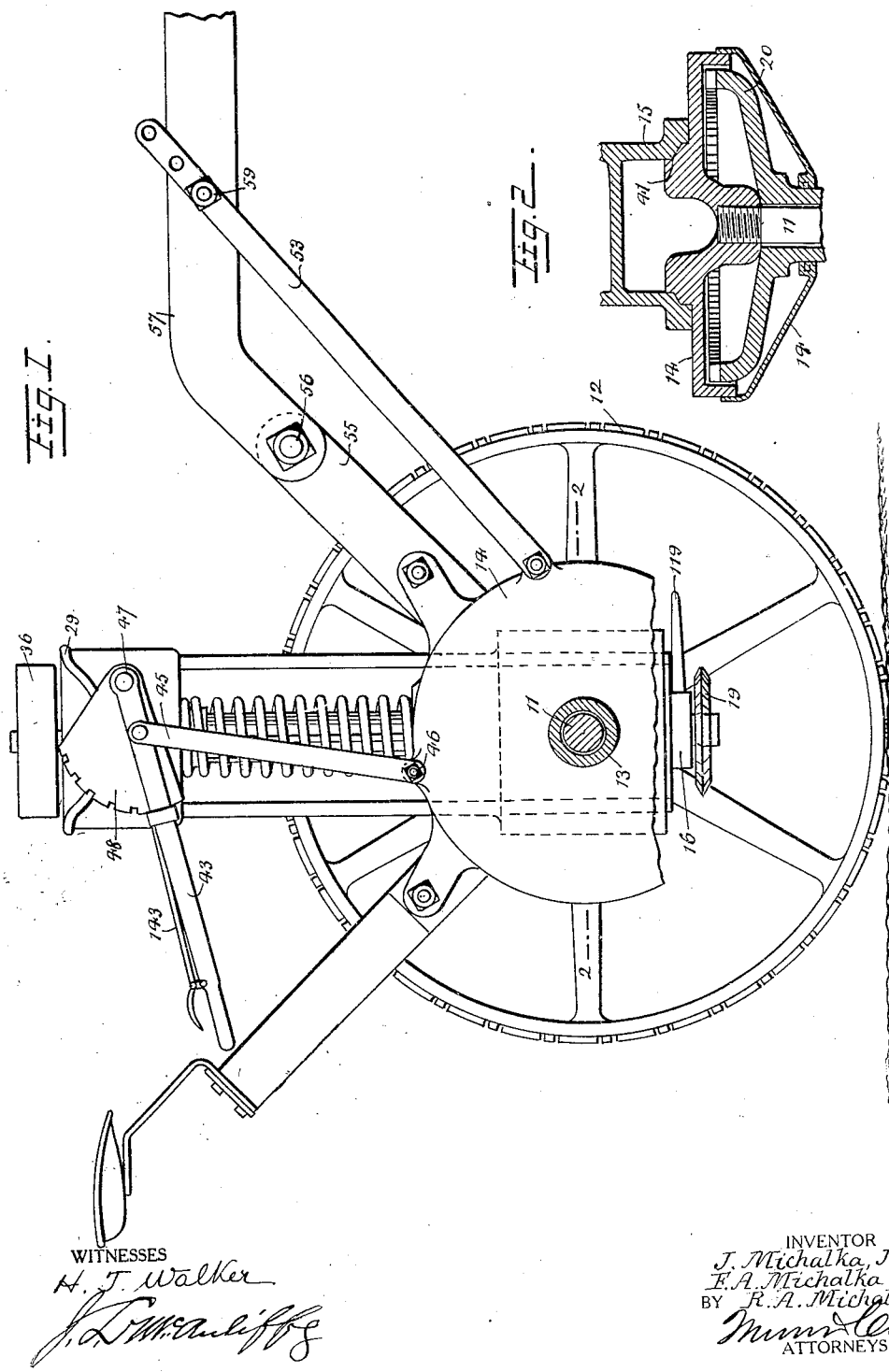
INVENTOR
J. Michalka, Jr
F. A. Michalka &
BY R. A. Michalka
ATTORNEYS July 3, 1928. 1,676,106
J. MICHALKA, JR., ET AL
STALK CUTTER
Filed April 1, 1926 3 Sheets-Sheet 2
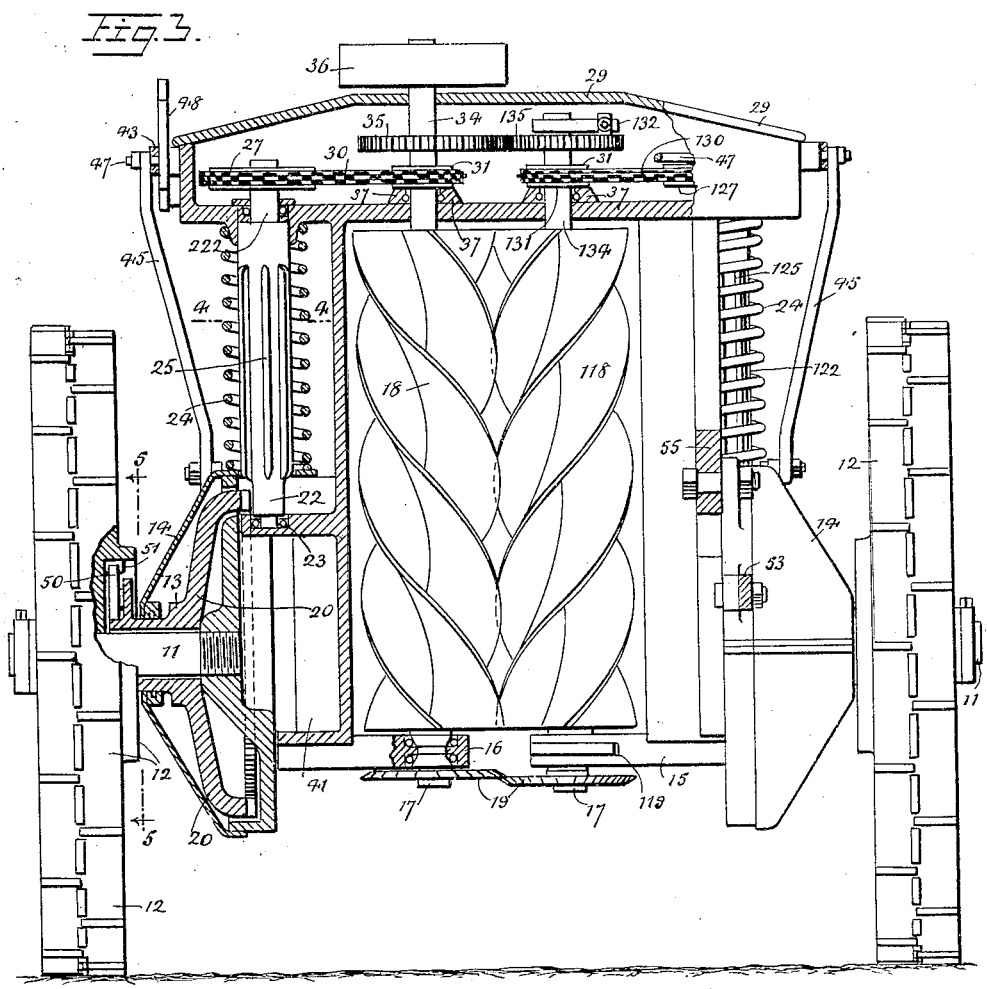
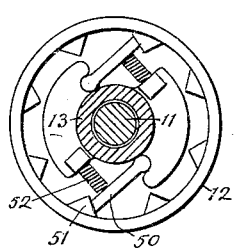
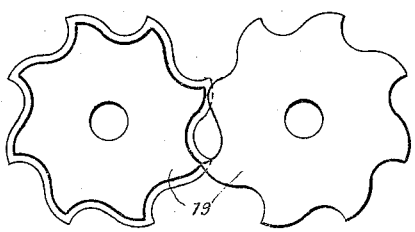
WITNESSES
H. T. Walker
INVENTOR
J. Michalka, Jr
F. A. Michalka &
BY R. A. Michalka
ATTORNEYS

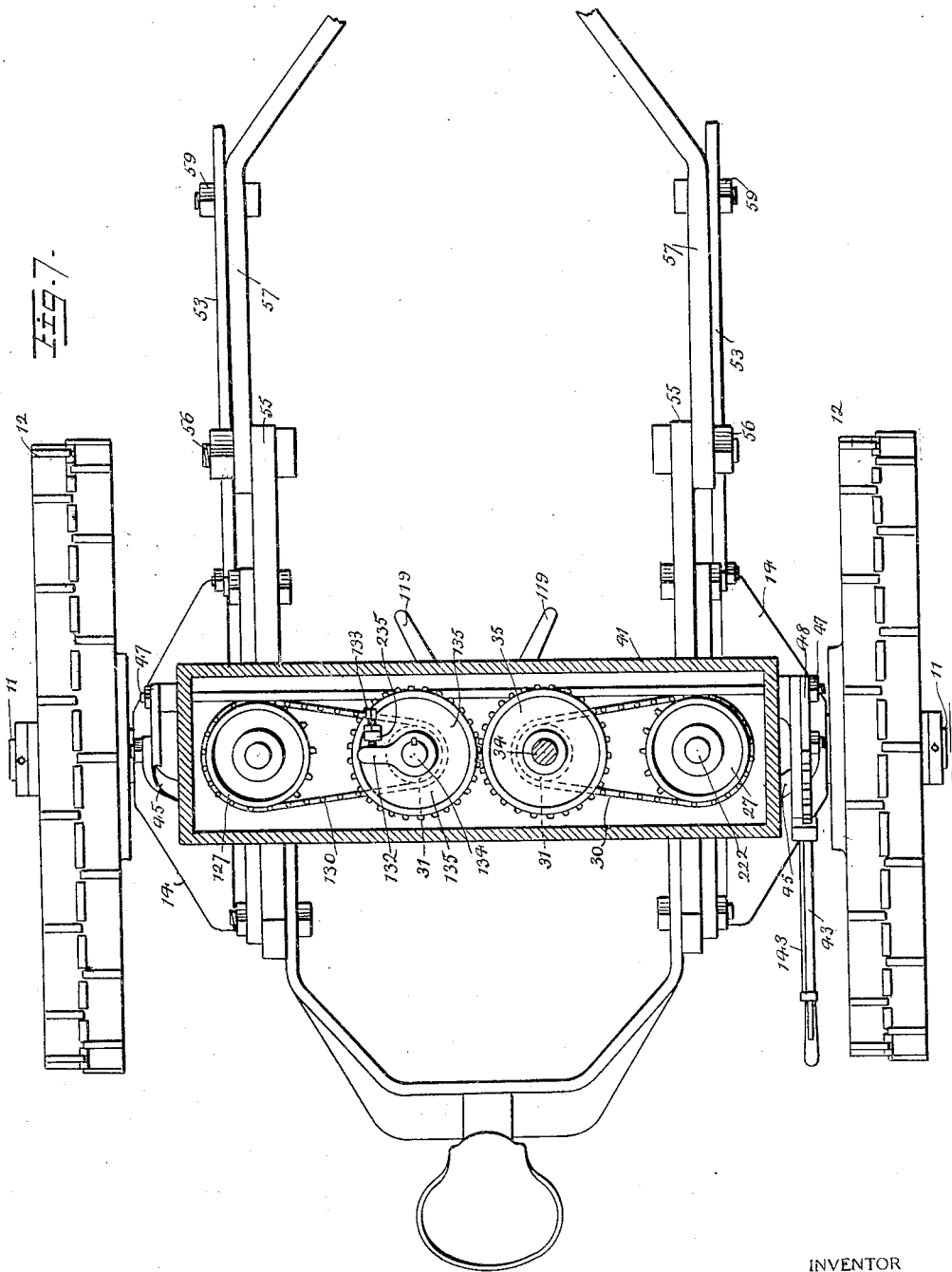

Patented July 3, 1928.

1,676,106

UNITED STATES PATENT OFFICE.

JOSEPH MICHALKA, JR., FRANK A. MICHALKA, AND RALPH A. MICHALKA, OF CAMERON, TEXAS.

STALK CUTTER.

Application filed April 1, 1926. Serial No. 99,112.

Our invention relates to a wheeled stalk cutter adapted to be drawn over a field to cause the stalks to be cut up in predetermined small lengths as the machine travels.

The present invention is designed more particularly as an improvement in the invention shown in the application of Joseph Michalka, Frank A. Michalka and Ralph A. Michalka, filed January 9, 1925, Serial Number 1,438.

The general object of the present invention is to provide in a stalk cutter of the class shown in the application referred to, an improved drive means for the spiral stalk cutting elements and improved means for effecting and breaking the drive connection between the running wheels and said drive means.

Reference is to be had to the accompanying drawings forming a part of this specification, it being understood that the drawings are merely illustrative of one example of the invention.

Figure 1 is a side elevation of a stalk cutter embodying our present invention;

Figure 2 is a detail on the line 2—2, Figure 1;

Figure 3 is a view of the stalk cutter partly in section and partly in front elevation;

Figure 4 is a cross section on the line 4—4, Figure 3;

Figure 5 is a transverse vertical section adjacent one of the running wheels as indicated by the line 5—5, Figure 3;

Figure 6 is a plan view of the pair of stalk severing knives employed in the previous construction referred to and in our present machine;

Figure 7 is a plan view of the machine with the gear box in horizontal section.

The present invention has the main features of the machine shown in the application above mentioned and in accordance with the illustrated example, said machine includes a suitable frame designated generally by the numeral 10. To fixed frame parts stud axles 11 are secured mounting the wheels 12, said axles passing through hubs 13 on the wheels, there being suitable dust caps 14 on the hubs constituting gear boxings or housings as will appear.

On members 15 at the bottom of the frame 10 are provided suitable bearings 16 to constitute step bearings or thrust bearings for the lower journals 17 of the pair of spiral chopping knives 18 and 118 turning about axes vertical or approximately so according to the work to be done. On the journals 17 are severing knives 19 shown in Figure 2 and overlapping. Adjacent to the severing knives 19 and extending forwardly thereof are horns 119 to gather the stalks and direct them to the chopping knives 18 and 118. It is to be noted that the spiral chopping knives are disposed vertically or approximately so at all times for the efficient reception and chopping of the stalks.

For driving the chopper knives 18 and 118 and the severing knives 19, the following means is employed at each side of the machine. A crown gear 20 turns with the hub 13 and is adapted to mesh with longitudinal ribs 25 on one vertical shaft 22 which turns at the bottom in a fixed bearing 23. A spring 24 is coiled about the shaft 22 and abuts at its lower end against the top of the adjacent dust cap 14. The upper reduced end 222 of shaft 22 turns in the bearing 28 in the bottom of the gear box 29 on the knife frame at the top of the latter and said reduced end 222 within the gear box 29 has a sprocket pinion 27 around which runs a sprocket chain 30, said sprocket chain running also about a sprocket pinion 31 on the shaft 34 of spiral knife 18. By relatively depressing the knife frame and with it the gear box 29, the splines 25 enter the interdental spaces between the teeth of the adjacent crown gear 20, thereby establishing a driving connection between said crown gear and the drive sprocket 27. The shaft 34 has a gear wheel 35 meshing with a corresponding gear wheel 135 loose on the shaft 134 of spiral stalk cutting knife 118. Also, a shaft 122 at the opposite side of the machine from the shaft 22 has a sprocket pinion 127 about which runs a sprocket chain 130 which runs also over a sprocket pinion 131 on the shaft 134 for driving the latter.

A crown gear 20, it will be understood, is provided at each side of the machine to drive the respective shafts 22 and 122. A spring 24 is also provided at each side of the machine. Said shaft 122 has splines 125. With the splines 25 in driven engagement with the crown gear 20, the drive of the spiral cutter knives will be as follows: The shaft 22 turns the sprocket pinion 27 and through chain 30 drives sprocket pinion 31 and the shaft 34 of spiral knife 18. If the drive is through the crown gear 20 at the opposite side of the machine, the shaft 122 will be driven and will drive the sprocket wheel 131 to turn sprocket pinion 31 on the shaft 134 of the spiral knife 118.

In order to drive the loose pinion 135 by the turning of shaft 134, we provide an arm 132 on shaft 134 and said arm is adapted to engage a screw 133 adjustable in an upright lug 235 on loose pinion 135.

By reason of the loose pinion 135 on shaft 134 being indirectly driven by the arm 132 and lug 235, the screw 133 may be employed to restore the shaft 134 and knife 118 after back-lash, and by moving the arm 132 through a slight arc when necessary, we can maintain the spiral cutter knife 118 in proper relation to and in contact with the spiral cutter 18. A flywheel 36 is provided on the shaft 34 and has particular usefulness when the machine is used for cutting heavy stalks. The shafts 34 and 134 pass freely through the bottom of gear box 29 surrounding the drive gear referred to and said shafts pass through bearing plates 37 on the inner side of the bottom of the gear box.

The frame elements 15 are in fixed relation to the gear box 29, and vertical guides 41 are provided as part of the knife frame, said guides being disposed at the outer sides of the chopper knives 18, 118.

The operation of moving the frame and the throwing the drive gear in and out are fully described in the aforenamed application.

The illustrated clutch means for turning the gear wheel 20 with the turning of wheel 12 and its hub 13 is shown in Figure 5 and consists of clutch pawls 50 adapted to engage ratchet teeth 51 at the interior of the hub of adjacent running wheel 12. The pawls 50 are subject to springs 52 which permit the pawls to slip over the ratchet teeth when running wheel 12 is turned backward with the backing of the vehicle. The elements shown for lifting the knife frame and bearing the reference characters 43 to 48 and 143 form no part of the present invention. Also, the elements bearing the characters 53 to 59 for tilting the frame 10 to dispose the severing knives 19 and horns 119 at an angle to the vertical plane form no part of the present invention and are fully described in the previously filed application above referred to.

We would state furthermore that while the illustrated example constitutes a practical embodiment of our invention, we do not limit ourselves strictly to the exact details herein illustrated, since, manifestly, the same can be considerably varied without departure from the spirit of the invention as defined in the appended claims.

Having thus described our invention, we claim:

1. A stalk cutter having running wheels whereby to travel over a field, coacting stalk chopping knives, shafts on which said knives are mounted, means to positively drive each shaft, a driven element fast on one shaft additional to the drive means thereof, an element loose on the other shaft and additional to the drive means of said shaft and meshing with said driven element fast on said one shaft, and means to turn said loose element with the turning of the shaft on which it is mounted.

2. A stalk cutter having running wheels whereby to travel over a field, coacting stalk cutting knives, shafts on which said knives are mounted, means to drive each shaft, and gear elements on the respective shafts and meshing with each other, the gear element on one shaft being turnably adjustable on the shaft on which it is mounted to permit varying of the relation of one shaft with its knife relative to the other shaft and its knife.

3. A stalk cutter having running wheels whereby to travel over a field, spiral stalk-cutting knives, shafts on which said knives are mounted, said knives being in such relation that the turning of one knife will cause the other knife to turn by engagement of the first knife, sprocket pinions on each shaft, means to drive said sprocket pinions separately from the respective running wheels, gear elements on said shafts meshing with each other, the one of said gear elements being loose on its shaft, and an element turning with the shaft on which said last element is mounted and engaging said element to turn the same.

4. A stalk cutter including a wheeled frame, vertically disposed guide means on said frame, a knife frame vertically movable in said guide means, rotary chopper knives in said knife frame, shafts for said knives, gear elements, means driven by the respective wheels of the frame for actuating said gear elements, and means to drive the respective shafts from said gear elements, said drive means including vertical shafts movable up and down with said vertically movable frame and formed with splines adapted to engage the said gear elements.

JOSEPH MICHALKA, Jr.
FRANK A. MICHALKA.
RALPH A. MICHALKA.